(12) United States Patent
Albrecht et al.

(10) Patent No.: US 7,193,806 B1
(45) Date of Patent: *Mar. 20, 2007

(54) FEEDBACK CONTROL MECHANISM FOR ACTIVE DAMPING OF SLIDER AIR BEARING VIBRATIONS IN A HARD DISK DRIVE SLIDER

(75) Inventors: Thomas R. Albrecht, San Jose, CA (US); Peter M. Baumgart, San Jose, CA (US); Bernhard E. Knigge, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 11/289,105

(22) Filed: Nov. 29, 2005

(51) Int. Cl.
G11B 21/02 (2006.01)
G11B 5/596 (2006.01)

(52) U.S. Cl. ............................. 360/75; 360/77.03
(58) Field of Classification Search ............... None
See application file for complete search history.

(56) References Cited

U.S. PATENT DOCUMENTS

| | | |
|---|---|---|
| 4,853,810 A | 8/1989 | Pohl et al. |
| 6,005,736 A | 12/1999 | Schreck |
| 6,359,746 B1 | 3/2002 | Kakekado et al. |
| 6,577,466 B2 | 6/2003 | Meyer et al. |
| 6,674,590 B2 * | 1/2004 | Ottesen et al. ............. 360/31 |
| 6,700,724 B2 | 3/2004 | Riddering et al. |
| 6,757,120 B2 | 6/2004 | Minoshima et al. |
| 7,012,777 B1 * | 3/2006 | Hirano et al. ............ 360/77.03 |
| 2002/0097517 A1 | 7/2002 | Bonin et al. |
| 2003/0043497 A1 | 3/2003 | Riddering et al. |
| 2003/0112547 A1 * | 6/2003 | Koso et al. ............. 360/78.05 |
| 2003/0169526 A1 | 9/2003 | Minoshima et al. |

FOREIGN PATENT DOCUMENTS

| | | |
|---|---|---|
| JP | 61113117 | 5/1986 |
| JP | 9097483 | 4/1997 |

OTHER PUBLICATIONS

"Discharge Mechanism for Electrostatic Fly Control" IEEE Transactions on Magnetics, vol. 40 No. 4 Jul. 2004.
"Electrostatically Loaded Slider Bearing" IBM TDB, Dec. 1969 p. 959.

* cited by examiner

Primary Examiner—Andrea Wellington
Assistant Examiner—Jason Olson

(57) ABSTRACT

In a feedback control mechanism for active damping of slider air bearing vibrations in a hard disk drive slider, a filter is used to filter a velocity signal from a slider to acquire a vibration signal. A phase-shifter, electrically coupled with the filter, shifts the phase of the vibration signal. An amplifier, electrically coupled with the phase-shifter, adjusts the amplitude of the phase-shifted vibration signal to achieve an amplitude adjusted vibration signal. An electrical coupler couples the amplitude adjusted vibration signal to the slider for actively damping air bearing vibrations in the slider.

14 Claims, 10 Drawing Sheets

FEEDBACK CONTROL MECHANISM FOR ACTIVE DAMPING OF SLIDER AIR BEARING VIBRATIONS IN A HARD DISK DRIVE SLIDER

RELATED UNITED STATES PATENT APPLICATIONS

This application is related to U.S. patent application Ser. No. 11/289,093 by T. Albrecht et. al., filed on Nov. 29, 2005, entitled "A Method of Feedback Control for Active Damping of Slider Air Bearing Vibrations in a Hard Disk Drive Slider," assigned to the assignee of the present invention, and hereby incorporated by reference in its entirety.

This application is related to U.S. patent application Ser. No. 11/288,604 by T. Albrecht et al., filed on Nov. 29, 2005, entitled "A Method of Feedback Control for Active Damping of Slider Air Bearing Vibrations in a Hard Disk Drive Slider," assigned to the assignee of the present invention, and hereby incorporated by reference in its entirety.

This application is related to U.S. patent application Ser. No. 11/289,037 by T. Albrecht et al., filed on Nov. 29, 2005, entitled "A Feedback Control Mechanism for Active Damping of Slider Air Bearing Vibrations in a hard Disk Drive Slider," assigned to the assignee of the present invention, and hereby incorporated by reference in its entirety.

TECHNICAL FIELD

The present invention relates to the field of hard disk drive development, slider vibration control, and more specifically to a feedback control mechanism for active damping of slider air bearing vibrations in a hard disk drive slider.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model includes a storage disk or hard disk that spins at a designed rotational speed. An actuator arm with a suspended slider is utilized to reach out over the disk. The slider includes a head assembly that has a magnetic read/write transducer or head for reading/writing information to or from a location on the disk. The complete head assembly, e.g., the suspension, slider, and head, is called a head gimbal assembly (HGA).

In operation, the hard disk is rotated at a set speed via a spindle motor assembly having a central drive hub. There are tracks at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), Moving Picture Experts Group audio layer 3 (MP3) players, and the like. For example, the original hard disk drive had a disk diameter of 24 inches. Modern hard disk drives are much smaller and include disk diameters of less than 2.5 inches. Advances in magnetic recording are also primary reasons for the reduction in size.

However, the small drives have small components with very narrow tolerances. Disk drive sliders are designed to fly in very close proximity to the disk surface. For instance, in some systems the slider may be designed to fly only three to five nanometers above the disk surface. In a system with such close tolerances, components can be subject to van der Waals, Meniscus, electrostatic, spindle motor charge up, and contact potential forces. These forces are due to a variety of causes, such as: the molecular attraction of components in very close proximity; adhesive friction caused by contact between the slider and the lubricant on the disk; the build up of electrical potential between the disk and the slider caused by the rotating disk surface (tribo-charging); the build up of electrical potential in motor bearings (tribo-charging); potential difference that exists between two different metals (different Fermi levels of slider and disk material); and impacts between the slider and disk surface. These forces alone, and in combination, create bouncing vibrations of the slider.

Bouncing vibrations of the slider are undesirable because they can cause media damage. Bouncing vibrations also cause variations in the magnetic spacing between the head element and media that are likely to cause data errors—both hard errors during writing and soft errors during reading. The bouncing vibration that causes the most concern occurs in the second pitch mode of the slider. This 'Pitch 2' mode vibration is typically around 250 kHz (kilo Hertz) and is incoherent.

One approach to reducing these bouncing vibration problems is to use rougher media or a padded slider. However, due to possible wear on these features, the actual contact area changes over time, often leading to more bounce vibrations. Increased damping of the slider through improved air bearing design is another approach. This provides some help in high disk RPM (revolutions per minute) applications, but is of little help at low disk RPM applications because the dampening force is far too weak to overcome the forces that cause the bounce vibrations. For instance, in low disk RPM applications, the Pitch 2 mode damping coefficient is usually less than 3% of the critical damping coefficient.

Another approach to reducing vibrations is electrostatic fly height control. This sort of active servo control of the slider can work well, but is difficult to implement in a functioning hard disk drive because it is complex and requires very precise measurements regarding fly height.

SUMMARY

In a feedback control mechanism for active damping of slider air bearing vibrations in a hard disk drive slider, a filter is used to filter a velocity signal from a slider to acquire a vibration signal. A phase-shifter, electrically coupled with the filter, shifts the phase of the vibration signal. An amplifier, electrically coupled with the phase-shifter, adjusts the amplitude of the phase-shifted vibration signal to achieve an amplitude adjusted vibration signal. An electrical coupler couples the amplitude adjusted vibration signal to the slider for actively damping air bearing vibrations in the slider.

BEST MODES FOR CARRYING OUT THE INVENTION

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with a brief overview of disk drive operation, focusing on the slider as it is utilized in the disk drive. Some of the forces that contribute slider bounce vibrations will be discussed. An apparatus and methods of feedback control for active damping of air bearing vibrations in a hard disk drive slider will then be described.

Figure 1:
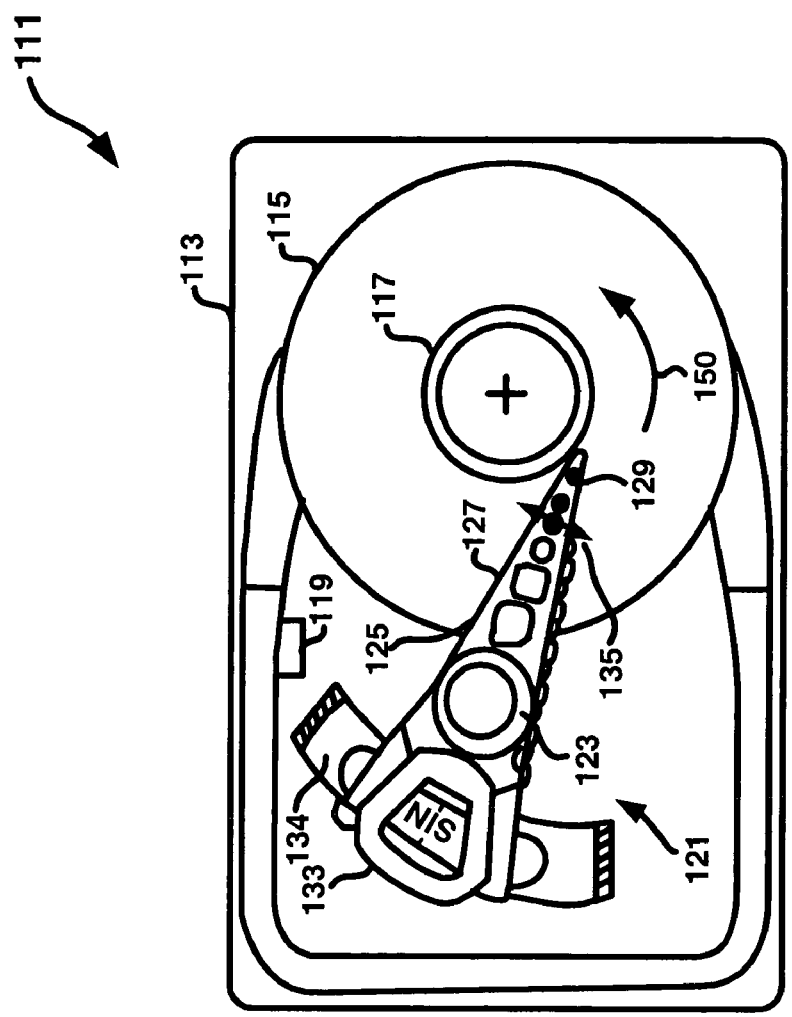
FIG. 1 is a schematic top plan view of a hard disk drive, in accordance with one embodiment of the present invention.

FIG. 1 shows a schematic drawing of one embodiment of an information storage system comprising a magnetic hard disk file or drive 111 for a computer system. Drive 111 has an outer housing or base 113 containing a disk pack having at least one media or magnetic disk 115. A spindle motor assembly having a central drive hub 117 rotates the disk or disks 115 in the direction shown by arrow 150. An actuator 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown in FIG. 1, each arm 125 has extending from it at least one cantilevered integrated lead suspension (ILS) 129. The ILS 129 may be any form of lead suspension that can be used in a data access storage device, such as a hard disk drive (HDD). The slider 230 (see FIG. 2) is usually bonded to the end of ILS 129, both of which are attached to a suspension 127. The suspension 127, in this embodiment, is used as a pathway to provide an electrical connection to the slider 230 (see FIG. 2). The slider 230 (see FIG. 2), in this embodiment, is electrically isolated from ground, and in some embodiments is also electrically isolated from the suspension 127. The level of integration containing the slider, suspension, ILS, and read/write head (not shown) is called the head gimble assembly (HGA).

The ILS 129 has a spring-like quality, which biases or presses the air-bearing surface of the slider 230 (see FIG. 2) against the disk 115 to cause the slider 230 (see FIG. 2) to fly at a precise distance from the disk 115. The ILS 129 has a hinge area that provides for the spring-like quality, and a flexing interconnect that supports read and write traces and electrical connections through the hinge area. A voice coil 133, free to move within a conventional voice coil motor magnet assembly 134 (top pole not shown), is also mounted to arms 125 opposite the head gimbal assemblies. Movement of the actuator 121 (indicated by arrow 135) by controller 119 causes the head gimbal assemblies to move along radial arcs across tracks on the disk 115 until the heads settle on their set target tracks. The head gimbal assemblies operate in a conventional manner and always move in unison with one another, unless drive 111 uses multiple independent actuators (not shown) wherein the arms can move independently of one another.

Figure 2:
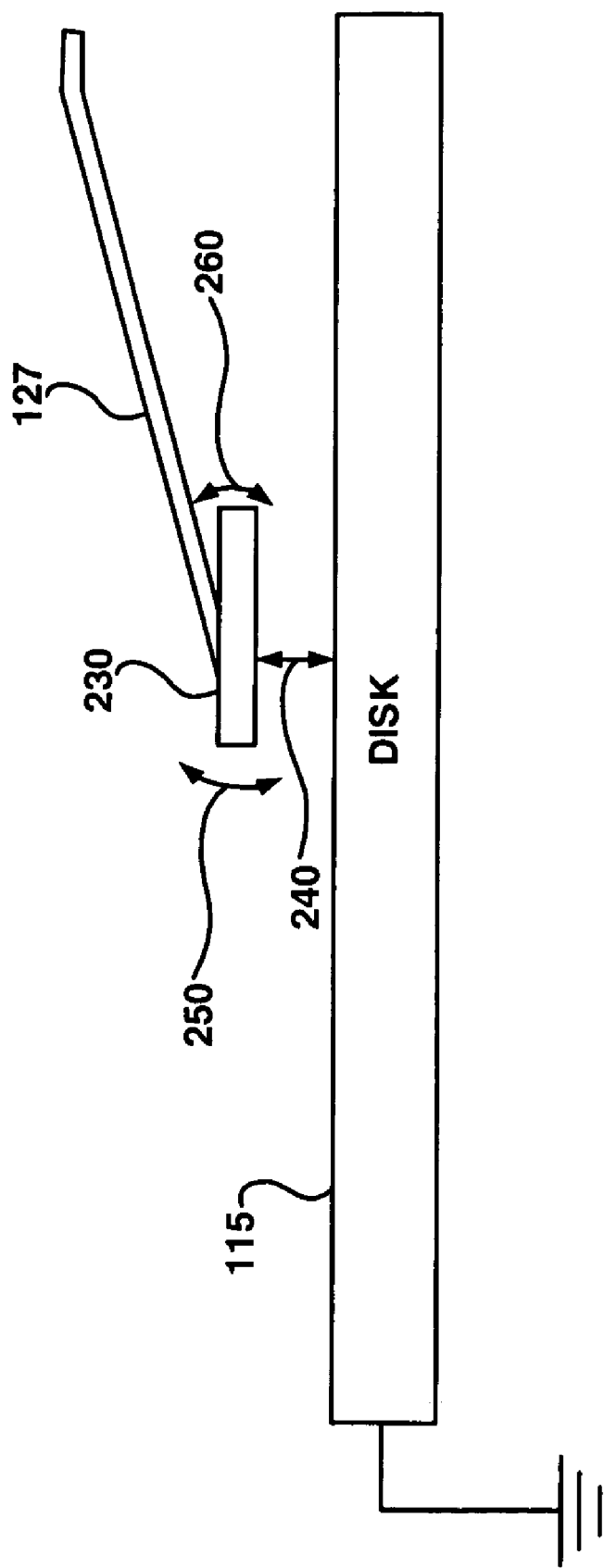
FIG. 2 is a side view of an exemplary suspension with attached slider, suspended over a disk, in accordance with one embodiment of the present invention.

FIG. 2 shows a side view of an exemplary suspension 127 with a slider 230 attached to the end of it. Slider 230 is shown suspended by suspension 127 over the surface of a disk 115, and is designed to fly in close proximity to the surface of disk 115. The arrow 240 represents the fly height of slider 230, which can be as little as three nanometers above the surface of disk 115. As previously explained, suspension 127 provides a conduit for an electrical connection to slider 230, but may itself be electrically isolated from slider 230, from ground, or from both.

Small drives in use today have small components with very narrow tolerances. In some systems slider 230 may be designed to fly only three nanometers above the surface of disk 115, while in others, the aim may be to actually put slider 230 into contact with the surface of disk 115. In disk drives with such close tolerances, components such as slider 230 can be subject to van der Waals, Meniscus, electrostatic, spindle motor charge up, contact potential, and impact forces.

These forces are due to a variety of causes, such as: the molecular attraction between components in very close proximity; adhesive friction caused by contact between slider 230 and the lubricant on disk 115; the build up of electrical potential between disk 115 and slider 230 caused by the rotating surface of disk 115 (tribo-charging); the build up of electrical potential at the motor bearings leading to a charged disk 115 (tribo-charging); the potential difference that exists between two dissimilar materials (ie different Fermi-levels of slider and disk material), and friction and contact between slider 230 and the surface of disk 115. These forces alone, and in combination, create bouncing vibrations in slider 230 that can cause media damage and can also cause data loss during read and write operations. Air bearing vibrations are a type of bounce vibrations.

Air bearing vibrations act on the slider in several modes, called Roll, first Pitch mode, and second Pitch mode vibration. In today's disk drives, the frequency range that includes the particular air bearing vibration modes of interest in the present invention is between approximately 50 kHz and approximately 500 kHz. The present invention is mainly concerned with actively counteracting bouncing vibrations in the Pitch 2 mode. These Pitch 2 mode vibrations create the most problems with read/write errors and media damage. In FIG. 2, arrows 250 and 260 show the direction of up/down motion imparted to a slider 230 experiencing Pitch 2 mode vibrations. The up/down motion (250 and 260) has a velocity that can be measured. The up and down motions (250 and 260) of slider 230 typically peak at a frequency of around 250 kHz. With a slider 230 fly height 240 of three nanometers above the surface of disk 115, a goal might be, for instance, to keep bounce vibrations to plus or minus one nanometer of dynamic modulation of the body of slider 230. This is very difficult with passive damping when a single force, such as friction can cause bounce vibrations of twenty to thirty nanometers.

An active means of control is what is needed. Methods of electrostatic servo control of the flying height of a slider exist. However, methods of electrostatic servo control are difficult to implement in a functioning hard disk drive because of their complexity and because of the precise measurements of slider flying height or other slider parameters, which need to be made. A simpler way, which is described by the present invention, is to sense only changes in slider 230 flying height 240 caused by a specific mode or modes of bounce vibrations (such as pitch 2 mode), and then dampen out these changes with electrostatic feedback. This is inherently easier to implement in a working hard disk drive, because the measurements needed are less precise and easier to obtain, and the goal is only to stabilize slider 230, not actively control its flying height.

Figure 3:
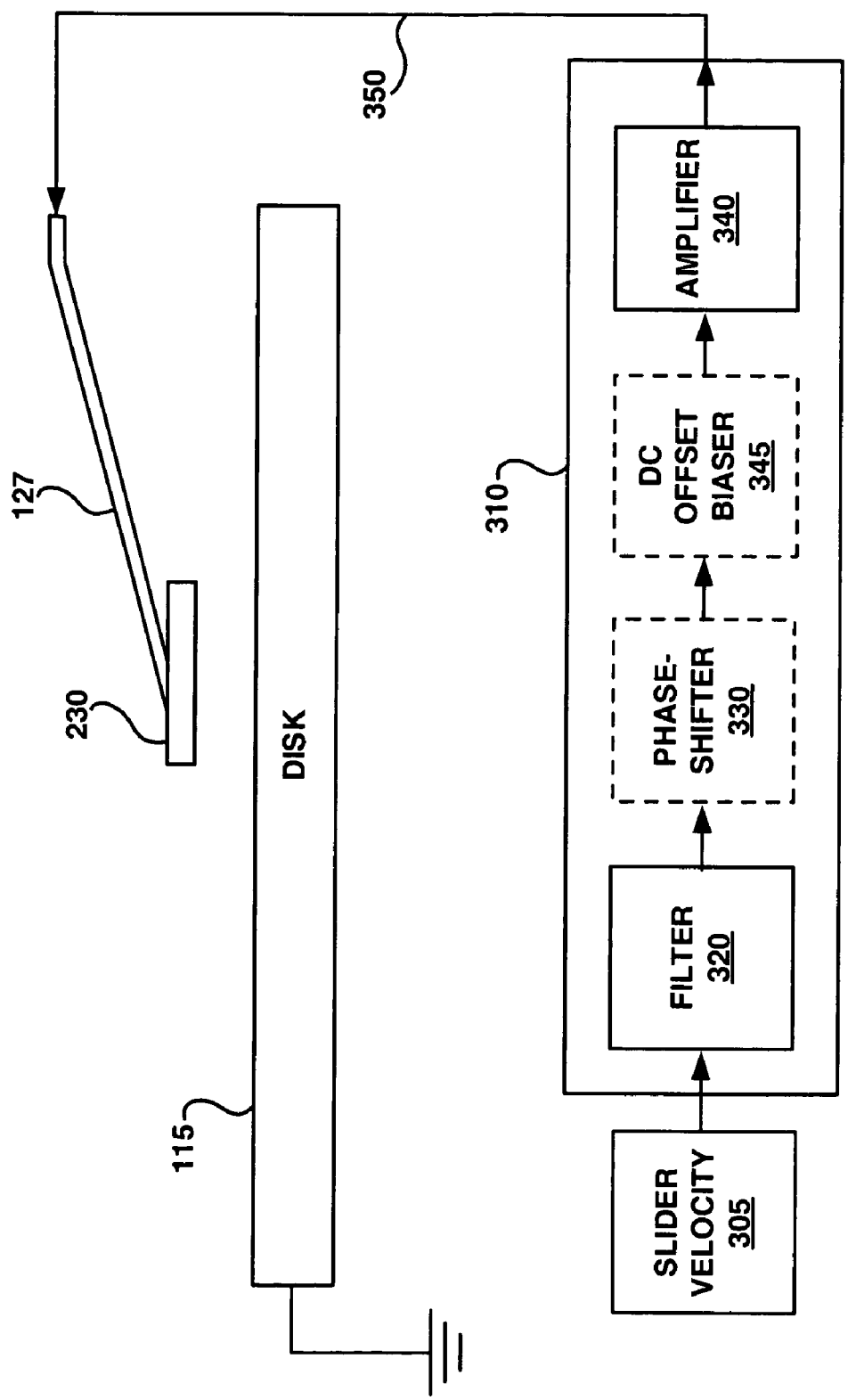
FIG. 3 shows a side view of an exemplary suspension, slider, and disk, in conjunction with a signal processor circuit to provide feedback control for active damping of slider air bearing vibrations in a hard disk drive slider, in accordance with one embodiment of the present invention.

FIG. 3 shows a side view of an exemplary suspension 127, slider 230, and disk 115, in conjunction with a signal processor circuit 310 to provide feedback control for active damping of air bearing vibrations in a disk drive slider 230, in accordance with one embodiment of the present invention. The disk 115 is attached to ground. The slider 230 is electrically isolated from ground and/or from the suspension 127 that it is attached to. This electrical isolation can be accomplished in a variety of ways, such as by providing an insulating material between the slider 230 and the suspension 127. In one embodiment of the present invention, portions of the suspension 127 can be partially covered with a polyimide film. The polyimide film prevents direct contact between the suspension 127 and the body of the slider 230, and simultaneously allows isolation of the slider 230 from ground. In one embodiment of the present invention, the entire suspension is isolated from ground, and the slider may or may not be electrically isolated from the suspension.

FIG. 3 also shows a slider velocity signal 305 that is electrically coupled with a signal processor 310. Slider velocity signal 305 is a measure of the velocity of up down motion of the slider in the Pitch 2 mode, as described by the arrows (250 and 260) in FIG. 2. Signal processor 310 develops a voltage in response to changes in slider velocity signal 305, and applies it to slider 230 via a feedback line 350 electrically coupled between slider 230 and the output of signal processor 310. In one embodiment of the present invention, feedback line 350 is embedded in suspension 127, but electrically isolated from suspension 127 by some means such as the use of polyimide coatings, then routed across suspension 127 to slider 230. Although signal processor 310 is shown as a single block (with internal functions) for simplicity, it should be understood that it could comprise several smaller circuits or one large circuit to accomplish each of its internal functions. For instance, a microprocessor or digital signal processor can be used to perform all of the functions of signal processor 310 in a single device.

In FIG. 3, as a slider velocity signal 305 enters signal processor 310 through an electrical coupling, it is then electrically coupled with a filter 320 to obtain a vibration signal. The output of filter 320 is a vibration signal. The filtering 320 is done to retain the portion of velocity signal 305 that contains vibrations in the air bearing range of the slider. For example, the Pitch 1 mode is typically seen at about 140 kHz, the Pitch 2 mode is typically seen at around 250 kHz, and the roll mode is typically seen at around 90 kHz. Capturing the bounce vibrations in the air bearing range, particularly the Pitch 2 mode vibrations, is the point of filter 320. In one embodiment of the present invention, filtering 320 is done with a high pass filter, keeping the portion of the signal above approximately 50 kHz. In another embodiment of the present invention, the velocity signal 305 is filtered 320 through a band pass filter to keep the portion of the signal between about 50 kHz and about 500 kHz. The high pass and band pass filters described above, assume a slider with a Pitch 2 frequency of around 250 kHz. If the vibrations in the air bearing range occur at different frequencies in another slider, it will be important adjust the filter 320 specifications to substantially capture the frequency range that contains the vibrations.

Capturing the Pitch 2 mode frequency range is the main concern of the filtering 320, since vibrations in this mode disturb the flying height, or spacing of slider 230 above disk 115. In some embodiments of the present invention, filtering 320 also captures vibrations in the Roll mode and Pitch 1 mode, though these generally have little impact on the fly height of the slider, simply to ensure complete capture of the Pitch 2 frequency range. Frequencies outside the range of a particular slider's Pitch 2 mode frequency range are kept only if they have a suitable phase shift so as not interfere with Pitch 2 damping when the vibration signal is later adjusted in amplitude and coupled with the slider 230. In one embodiment of the present invention, if it is determined that other frequencies near the Pitch 2 mode negatively impact damping if they are allowed through, then a narrower filtering range, passing substantially only the Pitch 2 mode frequency band is used in filter 320. For instance, in one embodiment of the present invention, in a slider with a Pitch 2 frequency centered at around 250 kHz, a bandpass filter capturing the range from about 200 kHz to about 300 kHz is used for filter 320.

Some embodiments of the present invention also incorporate a phase-shifter 330 into signal processor 310. In FIG. 3, phase-shifter 330 is electrically coupled with the output of filter 320 and receives a vibration signal as its input. It can be desirable to incorporate a phase-shifter 330 for several reasons. First, phase-shifter 330 gives a means to optimize control of the signal that is eventually fed back into slider 230 over feedback line 350. Maximum damping of bounce vibrations in the air bearing range occurs if the maximum voltage is applied at the maximum velocity. This is accomplished with a zero degree phase difference in the actual slider velocity and the feedback signal sent to the slider 230 over feedback line 350. Less damping, or even amplification will occur at other phase differences. Second, some signal processing such as filtering, and differentiation inherently cause phase shifts. If these phase shifts, or other phase shifts, need to be compensated for to achieve a desired level of damping, a phase-shifter 330 is added to signal processor 310. In the embodiment of the present invention illustrated in FIG. 3, phase-shifter 330 phase shifts the vibration signal and provides a phase-shifted version of the vibration signal as its output. In FIG. 3, the output of phase-shifter 330 is electrically coupled with the input of the optional DC (Direct Current) offset biaser 345. In some embodiments of the present invention, phase-shifter 330 is electrically coupled between filter 320 and amplifier 340. In other embodiments of the present invention phase-shifter 330 is located elsewhere in signal processor 310 and it outputs a phase-shifted version of its input signal. In some embodiments of the present invention, a separate phase-shifter 330 is not needed and is therefore not included in signal processor 310. In an embodiment without a phase-shifter 330, the output of filter 320 is electrically coupled with the input of either amplifier 340 or optional DC offset biaser 345, depending on the order in which the stages of signal processor 310 are assembled.

In the embodiment of the present invention shown in FIG. 3, the output of phase-shifter 330 is coupled with the input of optional DC offset biaser 345. DC offset biaser 345 then adds a DC offset bias to the signal it receives as an input. The output of DC offset biaser 345 is always equivalent to its input with the addition of a DC offset bias. In one embodiment of the present invention, DC offset biaser 345 is electrically coupled between the output of amplifier 340 and feedback line 350. In the absence of a DC (direct current) bias acting between slider body 230 and disk 115 surface, both polarities of voltage applied via feedback line 350 result in an attractive force. This results in a frequency doubling which renders the active damping ineffective. In most cases, however, contact potentials add an effective DC bias between slider 230 and disk 115, making the intentional addition of DC bias unnecessary. This is why DC offset biaser 345 is optional. In some embodiments of the present invention, DC offset biaser 345 can be implemented as a separate stage coupled between signal processor 310 and feedback line 350. In some embodiments, DC offset biaser 345 is not implemented as a separate stage, but as a function of amplifier 340, in which case amplifier 340 adjusts amplitude and adds DC offset to any signal received as an input. If DC offset biaser 345 is utilized with signal processor 310, air bearing design needs to take into account the constant force created by the DC component of the voltage applied to the slider body.

In the embodiment of the present invention illustrated in FIG. 3, the input of amplifier 340 is electrically coupled with the output of optional DC offset biaser 345. In one embodiment of the present invention, the input of amplifier 340 is electrically coupled with the output of phase-shifter 330. In one embodiment of the present invention, the input of amplifier 340 is electrically coupled with the output of filter 320. In some embodiments of the present invention amplifier 340 is a variable gain amplifier. The output of amplifier 340 is an amplitude adjusted version of its input signal. The amplitude adjustment can result in amplification or attenuation, depending on the configuration of amplifier 340, strength of its input signal, and requirements of its output signal. In one embodiment of the present invention illustrated in FIG. 3, the output of amplifier 340 is an amplitude adjusted vibration signal (which comprises a phase shift and a DC offset). The amplitude adjusted vibration signal output from amplifier 340 is coupled with slider 230 via feedback line 350. In this way, whenever large a positive velocity in slider 230 occurs, indicating a fast upward motion, a large voltage will be applied to slider 230 that will cause the upward motion to be slowed due to an attraction between slider 230 and disk 115. The attractive force is dependant on the magnitude of the voltage applied. This means a larger voltage causes a larger attraction. The use of a variable gain amplifier in amplifier 340 allows the attractive force to be adjusted depending on the upward velocity. The voltage output from amplifier 340 will be nearly sinusoidal, and in the frequency range of the vibrations of the air bearing range vibrations of slider 230.

Figure 4:
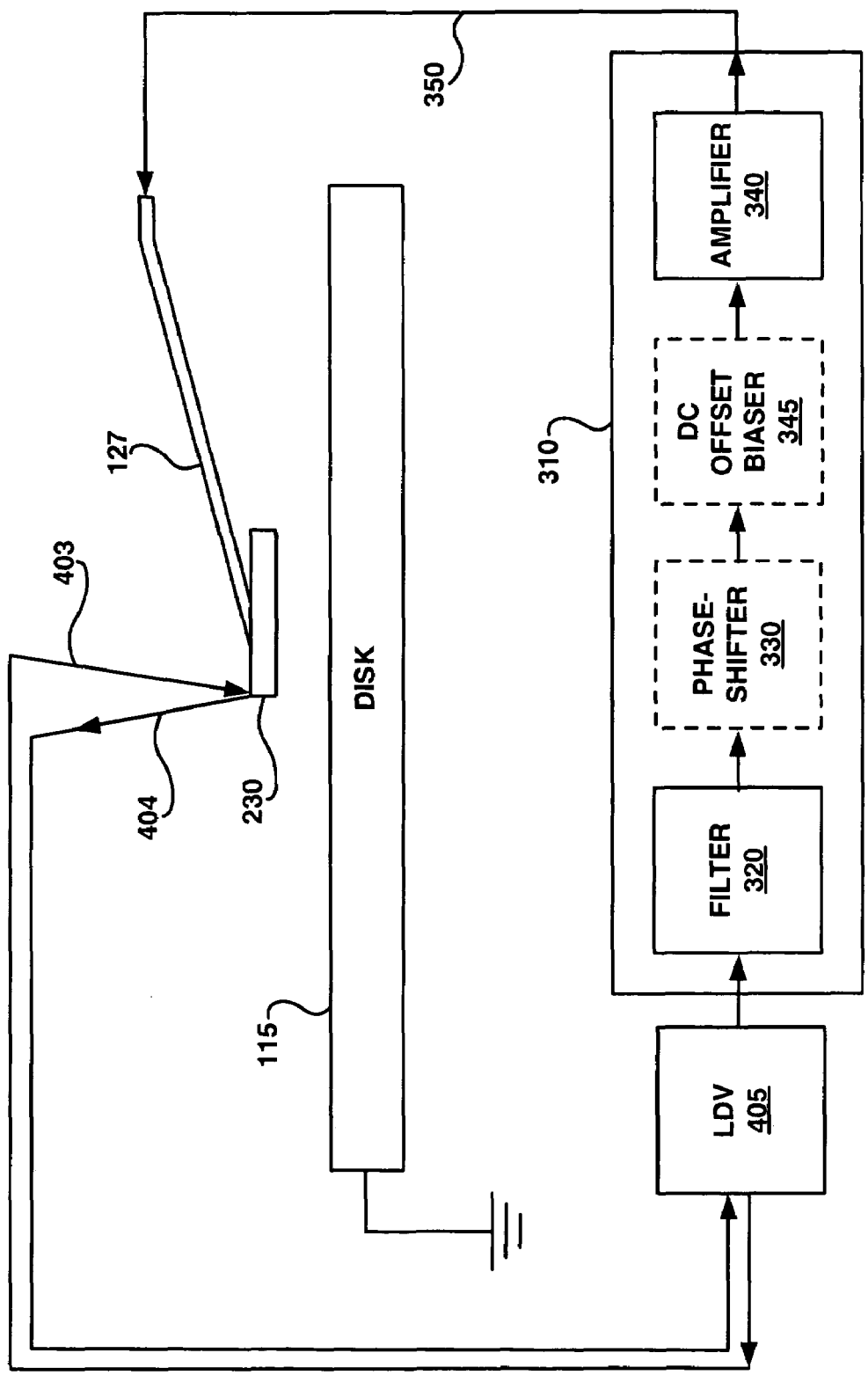
FIG. 4 shows a side view of an exemplary suspension, slider, and disk, in conjunction with a Laser Doppler Velocimeter for acquiring a slider velocity signal, and a signal processor circuit to provide feedback control for active damping of vibrations, in accordance with one embodiment of the present invention.

FIG. 4 shows a side view of an exemplary suspension, slider, and disk, in conjunction with a Laser Doppler Velocimeter (LDV) 405 for acquiring a slider velocity signal, and a signal processor circuit 310 to provide feedback control for active damping of slider air bearing vibrations, in accordance with one embodiment of the present invention. The components of FIG. 4 that are common with FIG. 3, function in the same manner as described in FIG. 3 and their descriptions are incorporated by reference. For instance, signal processor 310, filter 320, phase-shifter 330, amplifier 340, DC offset biaser 345, feedback line 350, suspension 127, slider 230, and disk 115 are the same as described in FIG. 3.

FIG. 4 differs from FIG. 3 in that it shows a Laser Doppler Velocimeter (LDV) 405 in use to acquire a velocity signal from the slider 230. LDV 405 then feeds the velocity signal into filter 320 of signal processor 310. LDV 405 is used in laboratory, manufacturing, test or other environments where the disk drive 111 (see FIG. 1) is opened to provide access to its internal components. A laser 403 from LDV 405 is directed at the trailing edge of slider 230 to sense slider pitch velocity (250 and 260 in FIG. 2). LDV 405 converts the reflected laser light 404 from slider 230 into a slider velocity signal and electrically couples the velocity signal as an input to filter 320 in signal processor 310. From this point on, the slider velocity signal from LDV 405 is processed in signal processor 310 and fed back into slider 230 via feedback line 350 as described in conjunction with FIG. 3.

Figure 5:
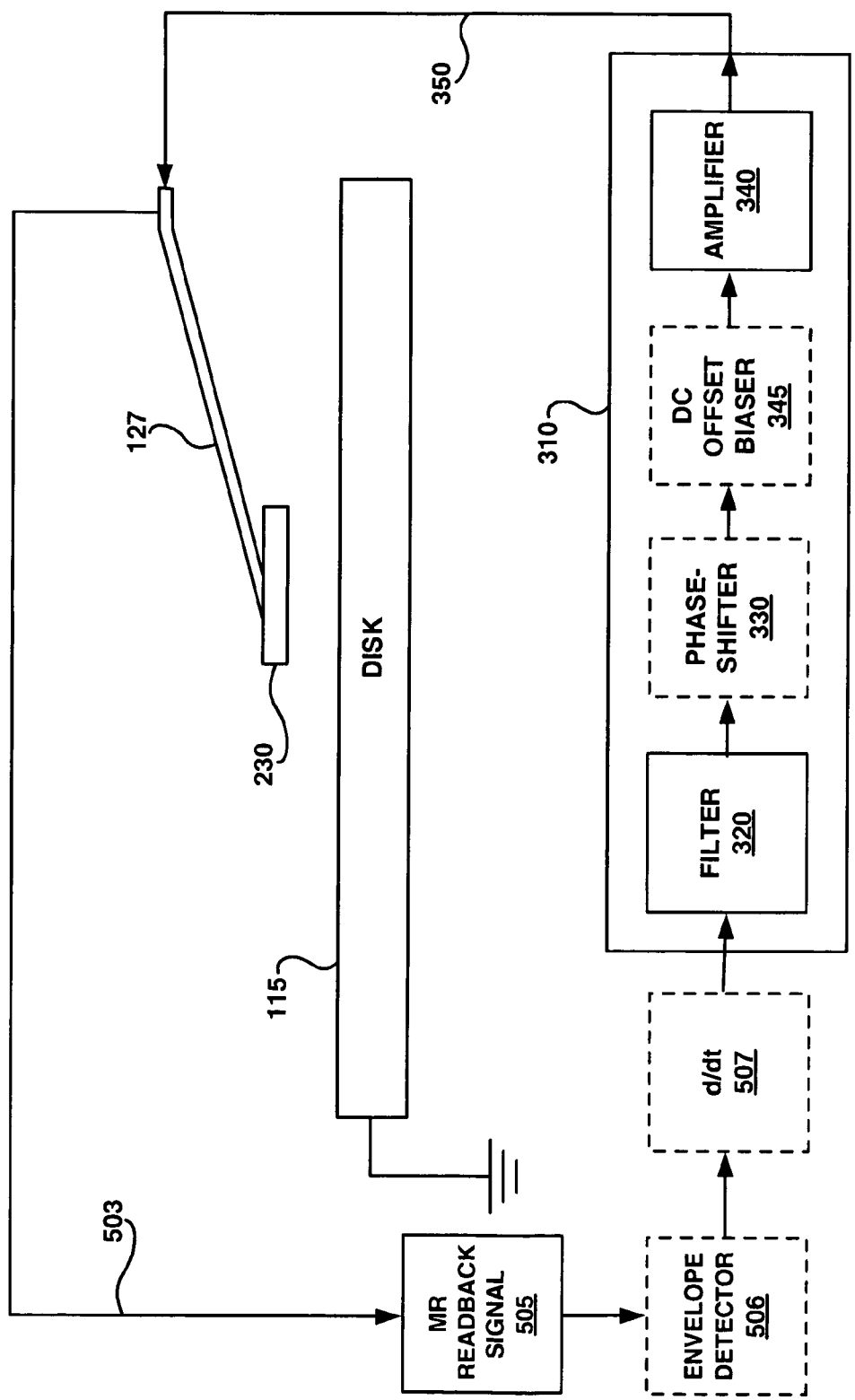
FIG. 5 shows a side view of an exemplary suspension, slider, and disk, in conjunction with an magneto-resistive element read back signal, envelope detector, and differentiator for acquiring a slider velocity signal, and a signal processor circuit to provide feedback control for active damping of vibrations, in accordance with one embodiment of the present invention.

FIG. 5 shows a side view of an exemplary suspension, slider, and disk, in conjunction with an magneto-resistive element read back signal 505, envelope detector 506, and differentiator 507 for acquiring a slider velocity signal, and a signal processor circuit 310 to provide feedback control for active damping of slider air bearing vibrations, in accordance with one embodiment of the present invention. The components of FIG. 5 that are common with FIG. 3, function in the same manner as described in FIG. 3, and their descriptions are incorporated by reference. For instance, signal processor 310, filter 320, phase-shifter 330, amplifier 340, DC offset biaser 345, feedback line 350, suspension 127, slider 230, and disk 115 are the same as described in FIG. 3.

FIG. 5 differs from FIG. 3 in that it shows a signal line 503 to transport a magneto-resistive (MR) read back signal 505 to an optional envelope detector 506 and then to a differentiator 507. In some embodiments of the present invention, a preamplifier (not shown) is also used to provide additional gain to MR readback signal 505. A microprocessor or digital signal processor can also be used to perform the functions of envelope detection 506, differentiation 507, and pre-amplification, as required. These functions can be performed in a single microprocessor or digital signal processor, either along with or apart from the functions of signal processor 310.

FIG. 5 shows acquiring MR readback signal 505 from a point on slider 127. However, MR readback signal 505 can be acquired directly from the MR element, or from any point within the disk drive where it is available by utilizing a suitable electrical coupling, assembly, or circuit. MR read back signal 505 is used to acquire a velocity signal from slider 230. In one embodiment of the present invention, optional envelope detector 506 is omitted, and MR read back signal 505 is differentiated 507 inside an operational hard disk drive to acquire a slider velocity signal. The acquired velocity signal is then electrically coupled as an input to filter 320 of signal processor 310.

MR read back signal 505 has an amplitude proportional to the spacing between slider 230 and disk 115. In one embodiment of the present invention, optional envelope detector 506 can be used to detect the amplitude of MR readback signal 505 by detecting the maximum amplitude points and creating a smoothed signal between these points. Through differentiation 507 of the MR readback amplitude signal generated by envelope detector 506 a slider velocity signal can be acquired. This slider velocity signal is then electrically coupled as an input to filter 320 of signal processor 310.

Within the relatively narrow bandwidth used in the follow-on filtering stage 320, the signals passed are nearly sinusoidal. Because of this, in some embodiments of the present invention, differentiator 507 is not used, since differentiation of a sinusoidal signal is merely equivalent to a phase-shift and frequency-dependent gain change. If a differentiator is not used, MR read back signal 505 is used as the slider velocity signal and electrically coupled as an input into filter 320 of signal processor 310. From this point on, the slider velocity signal is processed in signal processor 310 and fed back into slider 230 via feedback line 350 as described in conjunction with FIG. 3.

In one embodiment of the present invention, instead of analyzing the MR readback signal or the amplitude of the MR readback signal to measure slider velocity, a slider velocity signal can be derived from the MR baseline modulation. MR baseline modulation is a function of changes in resistance of the MR element. A slider velocity signal can be derived from the MR baseline modulation because the resistance of the MR element changes in relationship to the spacing of slider 230 (and attached MR element) from the surface of disk 115. For instance, when slider 230 flies at a relatively high height above disk 115, the resistance will be fairly constant. However, as slider 230 gets closer to disk 115, the resistance goes down. The decrease in the MR element resistance is due to cooling caused by increased airflow experienced in close proximity to the surface of spinning disk 115. The lower the spacing between slider 230 and spinning disk 115, the greater the cooling and lower the resistance of the MR element. However, if slider 230 makes contact with disk 115, this will cause friction and heat, and therefore increased resistance in the MR element. By continually measuring changes in the MR element resistance due to changes in fly height between slider 230 and spinning disk 115, velocity of slider 230 (toward and away from the surface of disk 115) can be measured. This measured velocity signal is then supplied as an input to signal processor 310, and is processed in the manner previously described. Circuitry for determining a slider velocity signal from the MR baseline modulation can be implemented in a single microprocessor or digital signal processor, either along with or apart from signal processor circuit 310.

Figure 6:
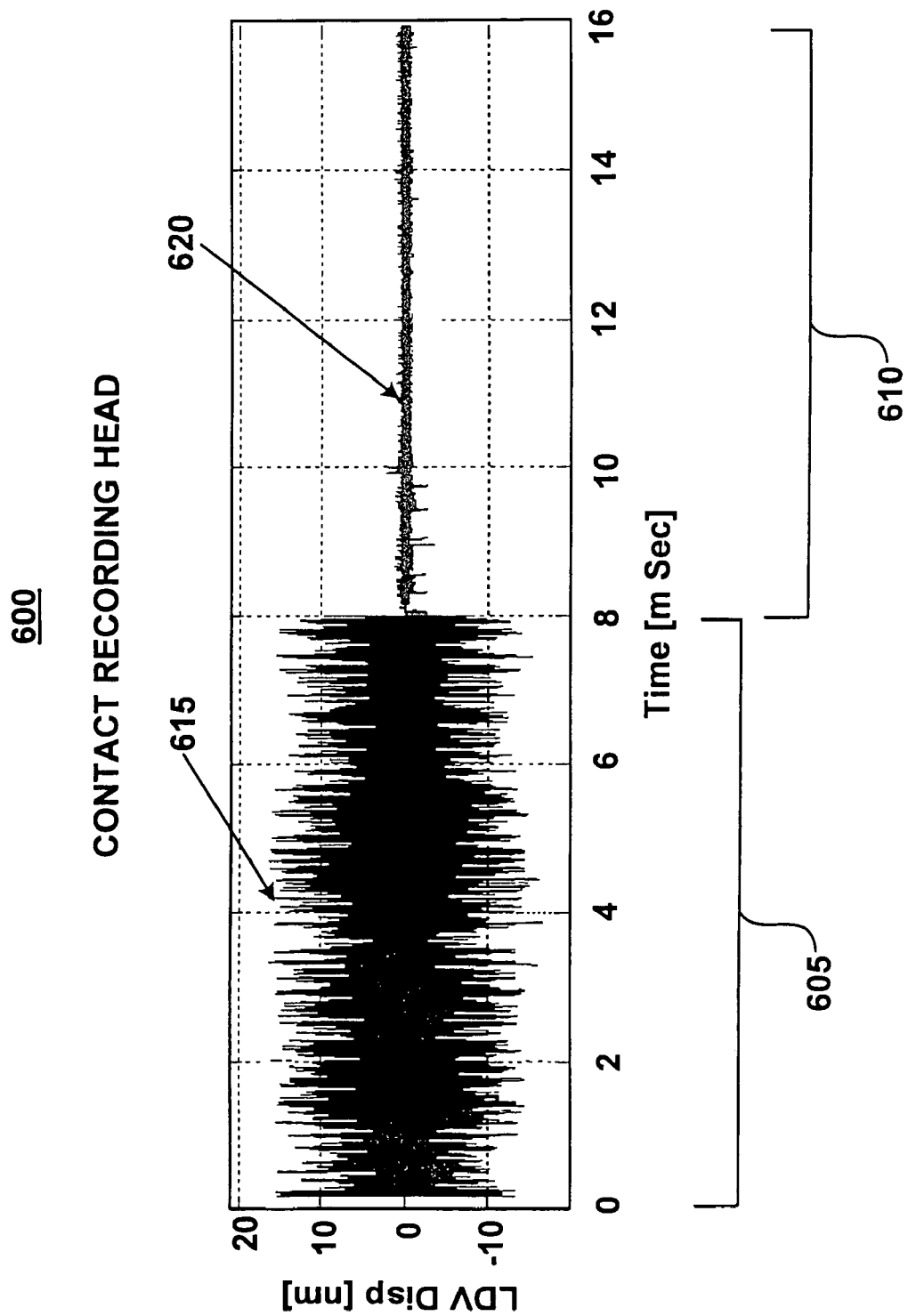
FIG. 6 shows an exemplary graph of slider displacement versus time for one revolution of a disk without active damping and one revolution of the same disk with active damping, in accordance with one embodiment of the present invention.

FIG. 6 shows an exemplary graph 600 of slider displacement versus time for one revolution of a disk without active damping and one revolution of the same disk with active damping, in accordance with one embodiment of the present invention. Graph 600 shows example results measured using a contact recording head. Slider displacement as measured by an LDV, is displayed on the Y-axis of graph 600 in nanometers (nm). The X-axis of graph 600 displays time in milliseconds (ms). The disk in use preformed one revolution in approximately 8 ms, so graph 600 displays approximately two disk revolutions. In the first revolution 605 of the disk, no active damping was used. In the first revolution 605, the top 1% of the measured slider displacement 615, or bounce vibration, is shown at approximately 15 nm. In the second revolution 610, a method and apparatus for feedback control for actively damping slider air bearing vibrations, as described in embodiments of the present invention, was utilized. The top 1% of measured slider displacement 620 during the second revolution 610 is shown as approximately 1 nm. Graph 600 indicates over 90% reduction in slider displacement during the second revolution 610 of the disk.

Figure 7:
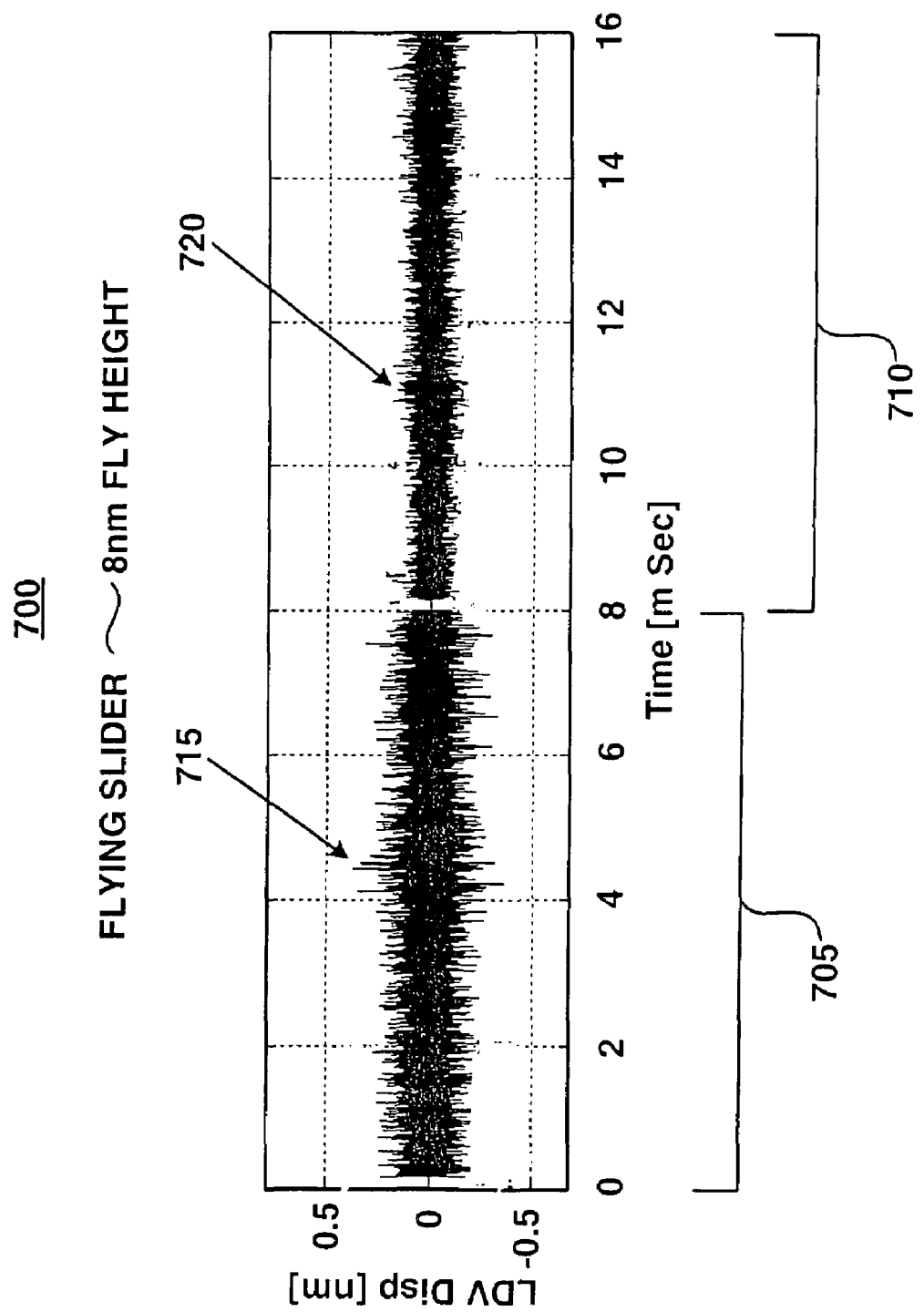
FIG. 7 shows an exemplary graph of slider displacement versus time for one revolution of a disk without active damping and one revolution of the same disk with active damping in accordance with one embodiment of the present invention.

FIG. 7 shows an exemplary graph 700 of slider displacement versus time for one revolution of a disk without active damping and one revolution of the same disk with active damping of slider, in accordance with one embodiment of the present invention. Graph 700 shows example results measured using a slider with a fly height of approximately 8 nanometers and approximately 130 microradians of pitch. Slider displacement as measured by an LDV, is displayed on the Y-axis of graph 700 in nanometers (nm). The X-axis of graph 700 displays time in milliseconds (ms). The disk in use preformed one revolution in approximately 8 ms, so graph 800 displays approximately two disk revolutions. In the first revolution 705 of the disk, no active damping was used. The top 1% of the measured slider displacement 715, or bounce, is shown at approximately 0.23 nm during the first revolution 705. In the second revolution 610, a method and apparatus for feedback control for actively damping slider air bearing vibrations, as described in embodiments of the present invention, was utilized. The top 1% of measured slider displacement 620, or bounce, is shown as approximately 0.14 nm during the second revolution 710. Graph 700 indicates approximately 40% reduction in slider peak displacement during the second revolution 710 of the disk.

Figure 8:
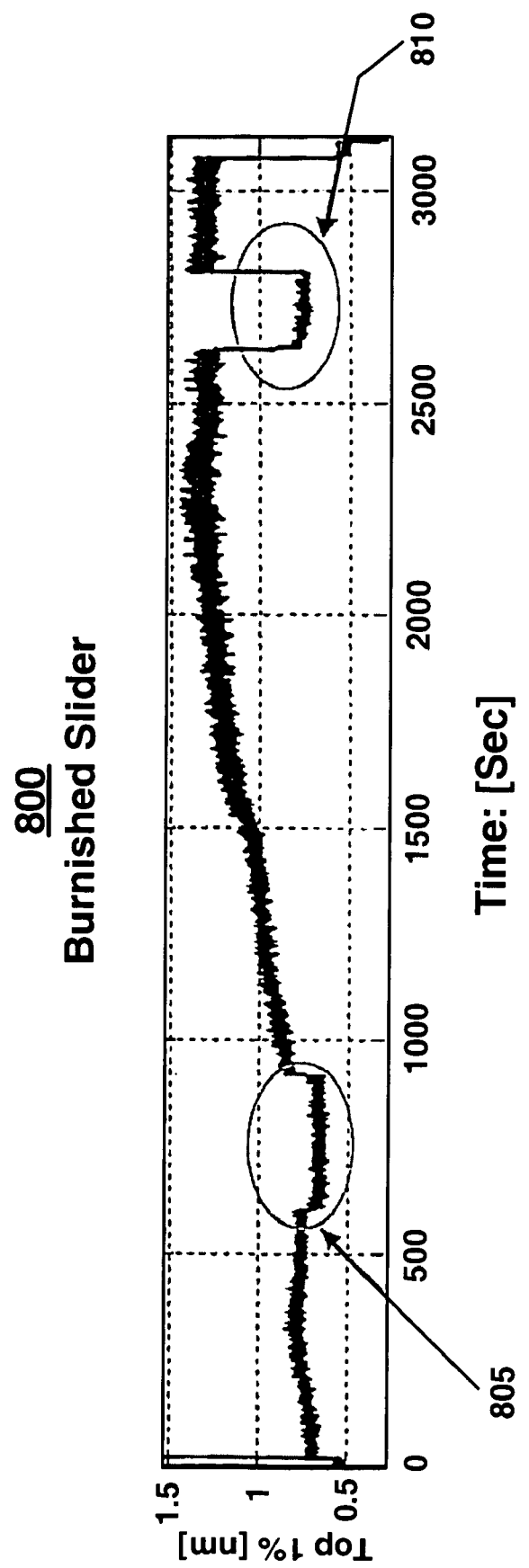
FIG. 8 shows an exemplary graph of slider displacement versus time, with and without active damping of the slider, in accordance with one embodiment of the present invention.

FIG. 8 shows an exemplary graph 800 of slider displacement versus time, with and without active damping of the slider, in accordance with one embodiment of the present invention. Graph 800 shows example results measured for a burnished slider, after burnishing. Slider displacement as measured by an LDV, is displayed on the Y-axis of graph 800 in nanometers (nm). The X-axis of graph 800 displays time in seconds (Sec). Graph 800 shows that slider clearance increases over time without active damping. Arrows 805 and 810 show two circled periods of time where a method and apparatus for feedback control for actively damping slider air bearing vibrations, as described in embodiments of the present invention, was utilized. In circled area 805, active damping was in use from approximately 600 seconds to approximately 900 seconds, and slider displacement was reduced by approximately 15%. In circled area 810, active damping was in use from approximately 2600 seconds to approximately 2800 seconds, and slider displacement was reduced by approximately 60%.

Figure 9:
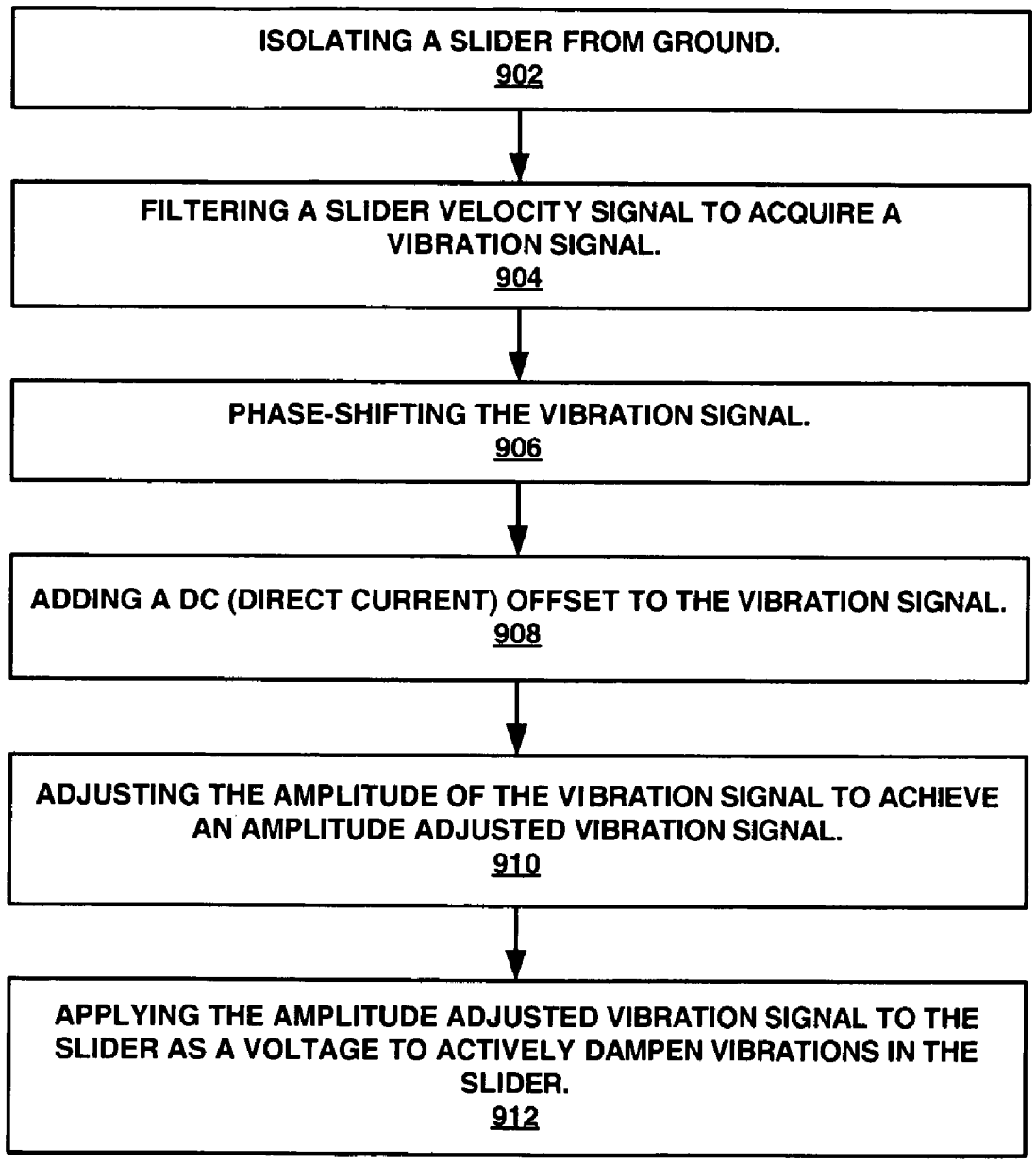
FIG. 9 shows a flowchart of a method of feedback control for active damping of slider air bearing vibrations in a hard disk drive slider, in accordance with one embodiment of the present invention.

FIG. 9 shows a flowchart 900 of a method of feedback control for active damping of slider air bearing vibrations in a hard disk drive slider, in accordance with one embodiment of the present invention. Reference is made to FIG. 2, FIG. 3, FIG. 4, and FIG. 5 to explain some portions of Flowchart 900.

Block 902 of FIG. 9, in one embodiment of the present invention, provides for isolating a slider 230 from ground. It is important to isolate slider 230 from ground so that voltages can be fed into it, to cause attractive forces between slider 230 and the disk 115. Slider 230 is electrically isolated from ground and/or from suspension 127 that it is attached to. In one embodiment of the present invention, the entire suspension 127 is isolated from ground, and the attached slider 230 may or may not be electrically isolated from suspension 127.

Block 904 of FIG. 9, in one embodiment of the present invention, provides for filtering 320 a slider velocity signal 305 to acquire a vibration signal. Filtering 320 is done to capture vibrations in the air bearing range for a particular slider 230, particularly the vibrations in the Pitch 2 mode. The Pitch 2 mode vibrations are typically found at around 250 kHz. A high pass filter, which keeps the component of the signal above about 50 kHz, is used in some embodiments of the present invention. Other embodiments of the present invention use a band pass filter to keep the portion of the signal between about 50 kHz and about 500 kHz. Other embodiments of the present invention narrow the frequency range even more, and use a band pass filter to keep the portion of the signal between about 200 kHz and about 300 kHz. In other embodiments of the present invention, the filter is a band pass filter, with a frequency range tuned such that it substantially encompasses and passes the air bearing Pitch 2 mode frequency range of the slider it is being used with. The output from filtering 320 is a slider vibration signal.

Block 906 of FIG. 9, in one embodiment of the present invention, provides for phase-shifting 330 a vibration signal. Phase-shifting 330 a vibration signal provides a means to optimize control of the signal that is eventually fed back into the slider. In some embodiments of the present invention, phase-shifting 330 is not needed, so it is not included. The output of phase-shifter 330 is a phase-shifted version of its input signal. In an embodiment of the present invention as illustrated in FIGS. 3, 4, and 5, an output of phase-shifter 330 is a phase-shifted slider vibration signal.

Block 908 of FIG. 9, in one embodiment of the present invention, provides for adding a DC (direct current) offset to the vibration signal. Some embodiments of the present invention utilize a DC offset voltage if there is not an existing or consistent enough bias between the slider and the disk due to contact potential or some other DC charge. The DC offset can be added before or after the amplitude adjustment of the vibration signal with amplifier 340. In some embodiments, a DC offset is added to a vibration signal that has been phase-shifted.

Block 910 of FIG. 9, in one embodiment of the present invention, provides for adjusting the amplitude of the vibration signal to achieve an amplitude adjusted vibration signal. The amplitude adjustment is provided by amplifier 340 and can be amplification or attenuation. This amplitude adjusted signal is ultimately fed into the slider 230 to add increased attractive force between the slider 230 and the disk 115 whenever the slider 230 bounces upward, away from the disk 115. In some embodiments of the present invention, a variable gain amplifier is used for amplifier 340, so that the resultant attractive force can be continually adjusted depending on the upward velocity of the slider 230. In some embodiments of the present invention the vibration signal that is electrically coupled with amplifier 340 comprises a phase-shifted slider vibration signal. In some embodiments the slider vibration signal that is electrically coupled with the input of amplifier 340 comprises a slider vibration signal with a DC offset added. In some embodiments of the present invention, the amplitude adjusted slider vibration signal also comprises a phase-shift and a DC offset.

Block 912 of FIG. 9, in one embodiment of the present invention, provides for applying the amplitude adjusted vibration signal to the slider 230 to actively dampen vibrations in the slider 230. Feedback line 350 provides an electrical coupling to apply the amplitude adjusted slider vibration signal to the slider 230. In some embodiments of the present invention, this electrical coupling is carried across suspension 127 to slider 230.

Figure 10:
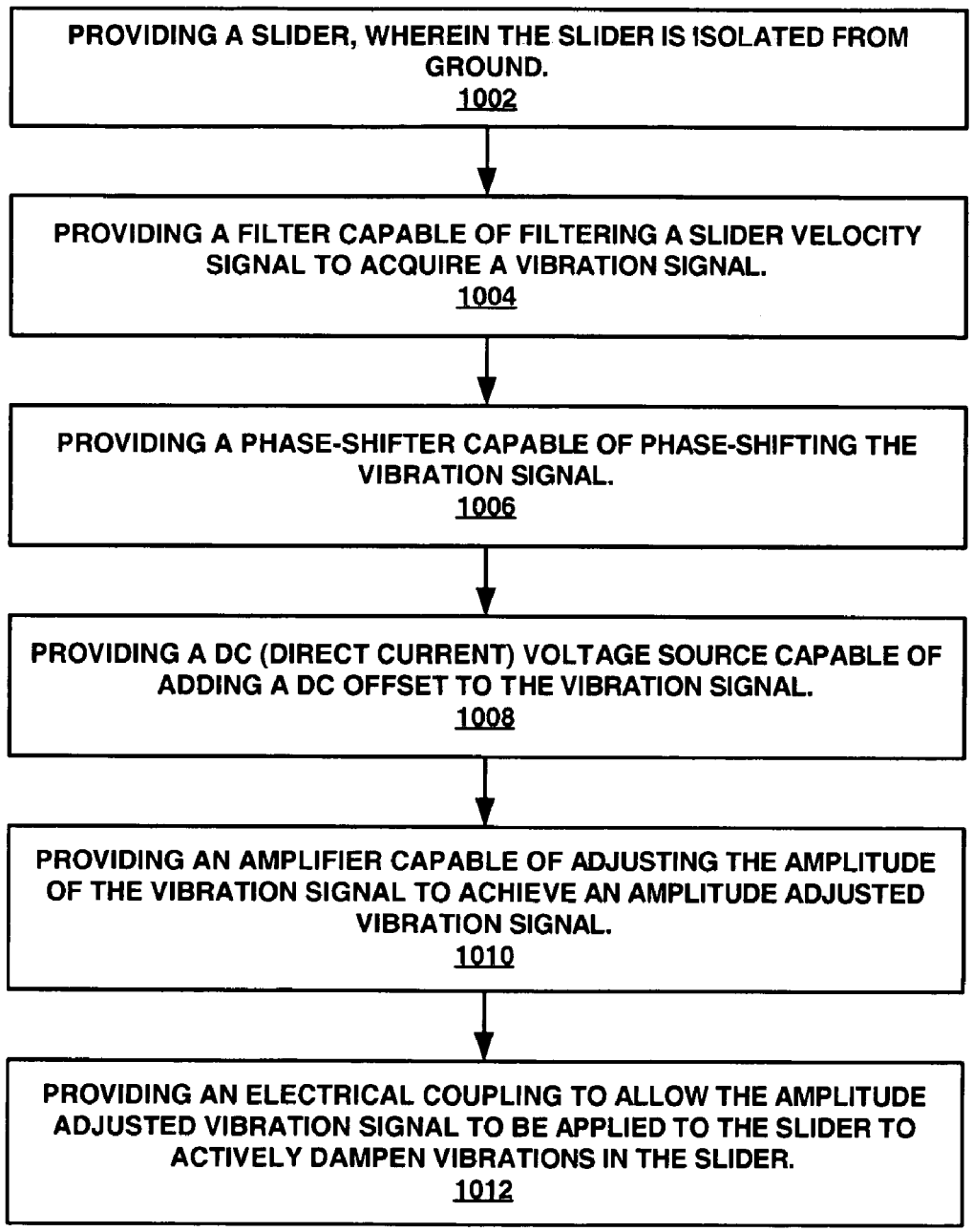
FIG. 10 shows a flowchart of a method of feedback control for active damping of slider air bearing vibrations in a hard disk drive slider, in accordance with one embodiment of the present invention.

FIG. 10 shows a flowchart 1000 of a method of feedback control for active damping of slider air bearing vibrations in a hard disk drive slider, in accordance with one embodiment of the present invention. Reference is made to FIGS. 3, 4, and 5 to explain some of the steps of Flowchart 1000.

Block 1002 of FIG. 10, in one embodiment of the present invention, shows providing a slider, wherein said slider is isolated from ground. It is important to isolate slider 230 from ground so that voltages can be fed into it, to cause attractive forces between slider 230 and disk 115. Slider 230 is electrically isolated from ground and/or from suspension 127 that it is attached to. In one embodiment of the present invention, the entire suspension 127 is isolated from ground, and the attached slider 230 may or may not be electrically isolated from suspension 127.

Block 1004 of FIG. 10, in one embodiment of the present invention, shows providing a filter capable of filtering a slider velocity signal to acquire a slider vibration signal. A filter 320 is used to capture vibrations in the air bearing range for a particular slider 230, particularly the vibrations in the Pitch 2 mode. The Pitch 2 mode vibrations are typically found at around 250 kHz. A high pass filter, which keeps the component of the signal above about 50 kHz, is used in some embodiments of the present invention. Other embodiments of the present invention use a band pass filter to keep the portion of the signal between about 50 kHz and about 500 kHz. Other embodiments of the present invention narrow the frequency range even more, and use a band pass filter to keep the portion of the signal between about 200 kHz and about 300 kHz. In other embodiments of the present invention, the filter is a band pass filter, with a frequency range tuned such that it substantially encompasses and passes the air bearing Pitch 2 mode frequency range of the slider it is being used with. The output from filtering 320 is a slider vibration signal.

Block 1006 of FIG. 10, in one embodiment of the present invention, shows providing a phase-shifter capable of phase-shifting the vibration signal to achieve an phase-shifted vibration signal. A phase-shifter 330 that phase-shifts a vibration signal provides a means to optimize control of the signal that is eventually fed back into the slider. In some embodiments of the present invention, a phase-shifter 330 is not needed, so it is not included. The output of phase-shifter 330 is a phase-shifted version of its input signal. In an embodiment of the present invention as illustrated in FIGS. 3, 4, and 5, an output of phase-shifter 330 is a phase-shifted slider vibration signal.

Block 1008 of FIG. 10, in one embodiment of the present invention, shows providing a DC (direct current) voltage source capable of adding a DC offset to the vibration signals. DC offset biaser 345 serves this purpose. Some embodiments of the present invention utilize a DC offset voltage if there is not an existing or consistent enough bias between the slider and the disk due to contact potential or some other DC charge. The DC offset can be added before or after the amplitude adjustment of the vibration signal. In some embodiments, a DC offset is added to a vibration signal that has been phase-shifted.

Block 1010 of FIG. 10, in one embodiment of the present invention, shows providing an amplifier capable of adjusting the amplitude of the vibration signal to achieve an amplitude adjusted vibration signal. Amplifier 340 serves this purpose. This amplitude adjusted signal is ultimately fed into the slider 230 to add increased attractive force between the slider 230 and the disk 115 whenever the slider 230 bounces upward, away from the disk 115. In some embodiments of the present invention, a variable gain amplifier is used in amplifier 340, and the resultant attractive force can be continually adjusted depending on the upward velocity of the slider 230. In one embodiment of the present invention, the amplitude adjusted slider vibration signal also comprises a phase shift. In one embodiment of the present invention, the amplitude adjusted slider vibration signal comprises also comprises a DC offset. In some embodiments of the present invention, the amplitude adjusted slider vibration signal also comprises a phase-shift and a DC offset.

Block 1012 of FIG. 10, in one embodiment of the present invention, shows providing an electrical coupling to allow the amplitude adjusted vibration signal to be applied to the slider as a voltage to actively dampen vibrations in the slider. Feedback line 350 provides an electrical coupling to apply the amplitude adjusted vibration signal to the slider 230. In some embodiments of the present invention, this electrical coupling is carried across suspension 127 to slider 230.

While the methods of the embodiments illustrated in flowcharts 900 and 1000 show a specific sequence and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

The alternative embodiments of the present invention, are thus described. While the present invention has been described in particular embodiments, it should be appreciated that the present invention should not be construed as limited by such embodiments, but rather construed according to the below claims.

What is claimed is:

1. A mechanism for feedback control for active damping of air bearing vibrations in a hard disk drive slider, said mechanism comprising:
a filter for filtering a velocity signal from a slider to acquire a vibration signal;
a phase-shifter electrically coupled with said filter, said phase shifter for shifting said filtered signal to achieve a phase shifted vibration signal;
an amplifier electrically coupled with said phase-shifter, said amplifier for adjusting an amplitude of said phase-shifted vibration signal to achieve an amplitude adjusted vibration signal; and
an electrical coupler for coupling said amplitude adjusted vibration signal to said slider for actively damping air bearing vibrations in said slider.

2. The mechanism of claim 1 further comprising:
a DC offset biaser circuit electrically coupled with said phase-shifter for adding a DC (direct current) bias to said phase-shifted vibration signal.

3. The mechanism of claim 1 wherein said filter is for retaining a portion of said velocity signal above approximately 50 kHz in frequency.

4. The actuator of claim 1 wherein said filter is for retaining a portion of said velocity signal between approximately 50 kHz in frequency and approximately 500 kHz in frequency.

5. The actuator of claim 1 wherein said filter is for retaining a portion of said velocity signal that substantially encompasses an air bearing pitch two mode frequency range of said slider.

6. The actuator of claim 1 wherein said amplifier comprises a variable gain amplifier.

7. A hard disk drive comprising:
a housing;
a disk pack mounted to said housing and having a plurality of disks that are rotatable relative to said housing, said disk pack defining an axis of rotation and a radial direction relative to said axis; and
an actuator mounted to said housing and being movable relative to said disk pack, said actuator having a plurality sliders containing heads for reading data from and writing data to said disks:
a plurality of mechanisms for feedback control for active damping of air bearing vibrations in said plurality of sliders, said mechanisms comprising:
a filter for filtering a velocity signal from a slider, of said plurality of slider, to acquire a vibration signal;
a phase-shifter electrically coupled with said filter, said phase-shifter for shifting said filtered signal to achieve a phase shifted vibration signal;
an amplifier electrically coupled with said phase-shifter, said amplifier for adjusting an amplitude of said phase-shifted vibration signal to achieve an amplitude adjusted vibration signal; and
an electrical coupler for coupling said amplitude adjusted vibration signal to said slider for actively damping air bearing vibrations in said slider.

8. The hard disk drive of claim 7 further comprising:
a DC offset biaser circuit electrically coupled with said phase-shifter for adding a DC (direct current) bias to said phase-shifted vibration signal.

9. The hard disk drive of claim 7 wherein said filter is for retaining a portion of said velocity signal above approximately 50 kHz in frequency.

10. The hard disk drive of claim 7 wherein said filter is for retaining a portion of said velocity signal between approximately 50 kHz in frequency and approximately 500 kHz in frequency.

11. The hard disk drive of claim 7 wherein said filter is for retaining a portion of said velocity signal that substantially encompasses an air bearing pitch two mode frequency range of said slider.

12. The hard disk drive of claim 7 wherein said amplifier comprises a variable gain amplifier.

13. A mechanism for feedback control for active damping of air bearing vibrations in a hard disk drive slider, said mechanism comprising:
a means for filtering a velocity signal from a slider to acquire a vibration signal;
a means for phase-shifting said vibration signal to achieve a phase-shifted vibration signal;
a means for adjusting an amplitude of said phase-shifted vibration signal to achieve an amplitude adjusted vibration signal; and
a means for electrically coupling said amplitude adjusted vibration signal to said slider to actively dampen air bearing vibrations in said slider.

14. The mechanism of claim 13, further comprising:
A means for adding a DC (direct current) bias to said amplitude adjusted vibration signal.

* * * * *